April 23, 1957 H. A. BENNETT 2,789,618
CAN CRUSHING MACHINES
Filed Aug. 10, 1953 2 Sheets-Sheet 1

INVENTOR.
Harrison A. Bennett
BY John H. Ruckman
Attorney

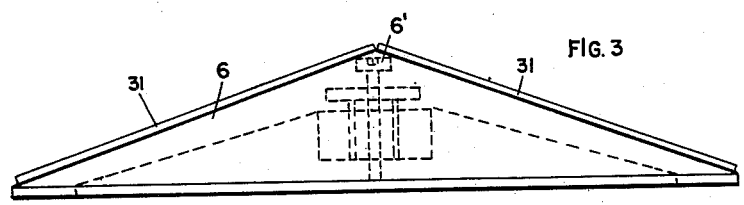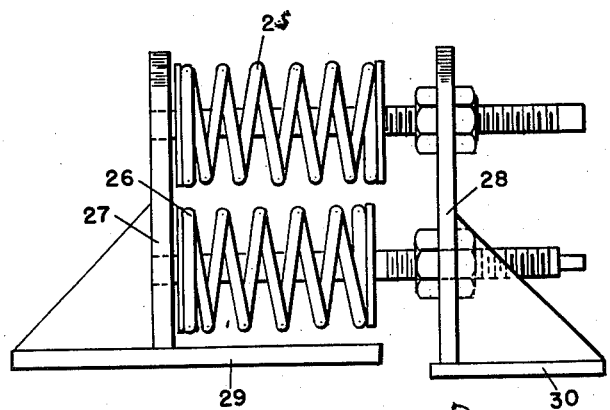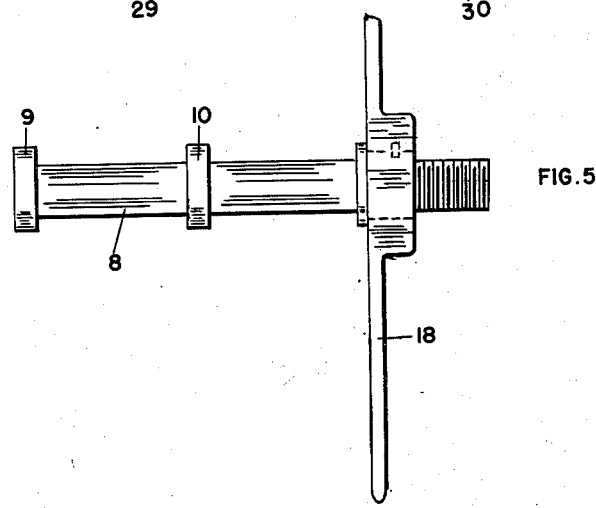

United States Patent Office 2,789,618
Patented Apr. 23, 1957

2,789,618

CAN CRUSHING MACHINES

Harrison Albert Bennett, New Orleans, La.

Application August 10, 1953, Serial No. 373,245

2 Claims. (Cl. 153—10.5)

My invention relates to can crushing machines.

An object of this invention is to provide a machine which will crush metal cans so that they may be packed in flat condition for storage and for shipment.

Another object is to provide a machine of this character which is efficient in operation for different sizes of the cans.

Another object is to provide a machine by means of which a succession of cans may be speedily crushed.

The said objects I have accomplished by means now to be described in detail and claimed, it being understood that changes in the precise embodiment of invention herein disclosed can be made within the scope of what is claimed without departing from the spirit of the invention.

The novel features which I believe to be characteristic of this invention are set forth with particularity in the appended claims. The invention itself, however, both as to organization and operation, together with additional objects and advantages thereof, will be best understood from the following description of a specific embodiment when read in connection with the accompanying drawings in which, Fig. 1 is a side elevational view of a can crushing machine.

Fig. 3 is a detail view of a crushing disc.

Fig. 4 is a detail view showing two associated springs.

Fig. 5 is a detail view of a shaft mounted in bearings.

Figure 1:
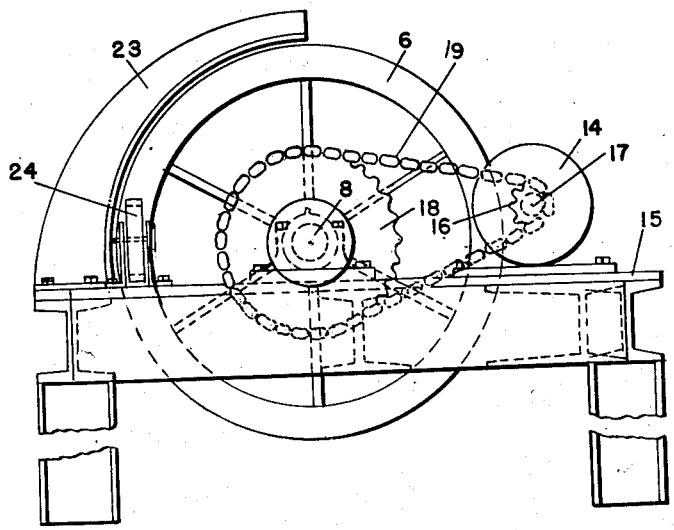

Referring to the construction shown in the drawings, there are two opposed conical cooperating crushing discs 6 and 7 having smooth rims and which converge toward each other from front to back whereby a space between them is provided at the front. The disc 6 is secured by a screw 6' to a shaft 8 which is mounted in bearings 9 and 10. The disc 7 is similarly secured to a shaft 11 which is mounted in bearings 12 and 13. As shown in Fig. 1, a motor 14 is mounted on a table or support 15. The bearings 9 and 10 are secured to the table 15. A small sprocket wheel 16 is secured to the motor shaft 17. A larger sprocket wheel 18 is secured to the shaft 8. A sprocket chain 19 is adapted run around the two sprocket wheels and rotate the disc 6.

Figure 2:
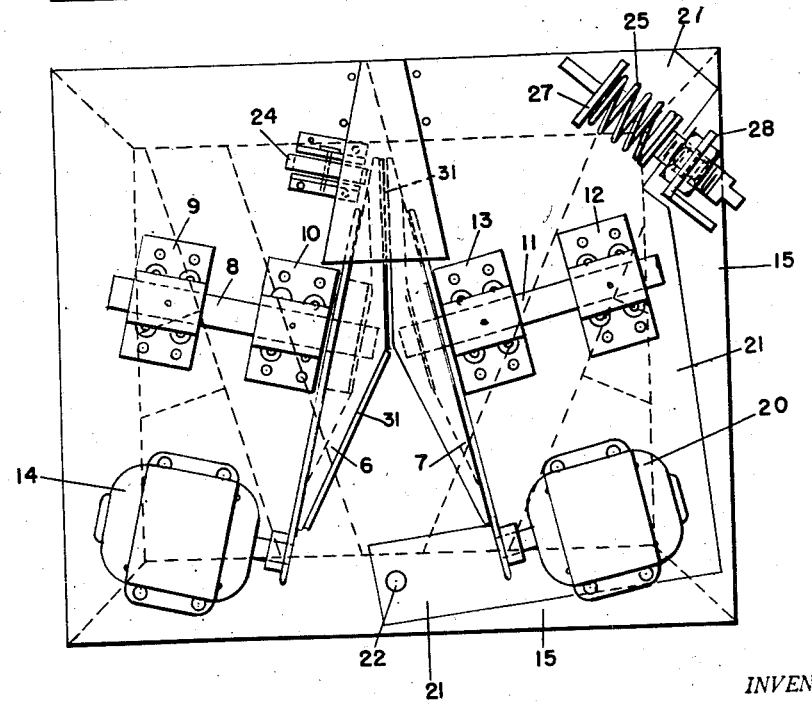
Fig. 2 is a top plan view thereof.

By referring to Fig. 2, it will be understood that a motor 20 is mounted on a plate 21 which is pivoted at 22 to the table 15. The bearings 12 and 13 are secured to the plate 21. The motor 20 is adapted to rotate the disc 7 by means of a sprocket connection like that described for the disc 6. In Fig. 2 both sprocket connections are hidden inside of the concave discs 6 and 7. An arcuate guard 23 is secured to the table 15 and extends around the rear of the discs whereby the crushed cans are caused to drop from the discs through an opening in the table 15. As shown in Fig. 1, the disc 6 is backed up by a small rotatable wheel 24 mounted on the table 15. The periphery of this wheel engages the rim of the disc 6.

As best shown in Fig. 4, a pair of adjustable springs 25 and 26 are positioned between uprights 27 and 28. The base 29 of the upright 27 is secured to the pivoted plate 21. The base 30 of the upright 28 is secured to the table 15.

The operation and advantages of this machine will be apparent from the preceding description in connection with the drawings. The cans which are to be crushed are fed in any suitable manner in succession between the front portions of the discs 6 and 7 from which they pass into the bight between the discs where they are crushed into flattened condition. The discs 6 and 7 rotate downwardly at the front of the machine. Upon reaching the guard 23, the cans drop down through an opening in the table 15 in front of the guard 23 to be taken away in any suitable manner. Since the disc 7 and its operating mechanism are mounted on the pivoted plate 21, they are capable of moving toward the right as viewed in Fig. 2 against the force exerted by the springs 25 and 26. In this manner, provision is made for crushing cans of different sizes.

As shown in Figs. 2 and 3, two opposite breaker bars 31 are secured to the inner surface of the disc 6. These bars serve to push the cans forwardly between the disks.

I claim:

1. In a can crushing machine, the combination of a table, a plate pivoted to the upper side of said table for sidewise movement thereon, two cooperating conical crushing discs which converge from front to back to form a horizontal bight, one of said discs being mounted on said table, the other disc being mounted on said pivoted plate to permit outward movement of this disc, two motors for independently rotating said discs respectively, one of said motors being secured to said table, the other motor being secured to said pivoted plate, and a spring device for opposing movement of the plate mounted disc away from the other of said discs.

2. In a can crushing machine, the combination of a table, a plate pivoted to the upper side of said table for sidewise movement thereon, two cooperating conical crushing discs which converge from front to back to form a horizontal bight, one of said discs being mounted on said table, the other disc being mounted on said pivoted plate to permit outward lateral movement of this disc, two motors for independently rotating said discs respectively, one of said motors being secured to said table, the other motor being secured to said pivoted plate, a spring device for opposing outward movement of the plate mounted disc away from the other of said discs, and a breaker bar attached to the inner surface of one of said discs for pushing cans forwardly into said horizontal bight, said bar extending outwardly from the center of the attaching disc.

References Cited in the file of this patent

UNITED STATES PATENTS

| 43,095 | Clarke | June 14, 1864 |
| 61,347 | Mason | Jan. 22, 1867 |
| 263,226 | Rogers | Aug. 22, 1882 |
| 2,356,122 | Edwards | Aug. 15, 1944 |